United States Patent
Hahl et al.

(10) Patent No.: US 8,947,078 B2
(45) Date of Patent: Feb. 3, 2015

(54) MEASURING APPARATUS, PARTICULARLY MEASURING APPARATUS FOR SENSING METAL ARTICLES

(75) Inventors: Markus Hahl, Kortal-Muenchingen (DE); Christoph Wieland, Penang (MY); Andrej Albrecht, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 156 days.

(21) Appl. No.: 13/819,584

(22) PCT Filed: Jul. 29, 2011

(86) PCT No.: PCT/EP2011/063058
§ 371 (c)(1),
(2), (4) Date: May 13, 2013

(87) PCT Pub. No.: WO2012/028401
PCT Pub. Date: Mar. 8, 2012

(65) Prior Publication Data
US 2014/0028301 A1     Jan. 30, 2014

(30) Foreign Application Priority Data
Aug. 30, 2010  (DE) .......................... 10 2010 039 946

(51) Int. Cl.
G01N 27/72     (2006.01)
(52) U.S. Cl.
USPC .......................................... 324/234; 324/228
(58) Field of Classification Search
USPC ....................................................... 324/234
See application file for complete search history.

(56) References Cited

U.S. PATENT DOCUMENTS

| | | | |
|---|---|---|---|
| 3,609,522 A * | 9/1971 | Hutchins et al. | 324/334 |
| 3,617,866 A * | 11/1971 | Dowsett et al. | 324/330 |
| 3,882,374 A * | 5/1975 | McDaniel | 324/329 |
| 4,906,973 A | 3/1990 | Karbowski et al. | |
| 7,701,191 B2 * | 4/2010 | Skultety-Betz et al. | 324/67 |
| 2008/0224704 A1 | 9/2008 | Westersten | |
| 2008/0297158 A1 * | 12/2008 | Heger et al. | 324/326 |

FOREIGN PATENT DOCUMENTS

| | | |
|---|---|---|
| DE | 10 2004 047 190 A1 | 4/2006 |
| DE | 10 2005 007 803 A1 | 8/2006 |

OTHER PUBLICATIONS

Yamazaki, Basic analysis of a metal detector, IEEE Inst. and Meas. Tech. Conf., Budapest, Hungary, May 21, 2001, p. 474-477.*
International Search Report corresponding to PCT Application No. PCT/EP2011/063058, mailed Nov. 23, 2011 (German and English language document) (7 pages).

* cited by examiner

*Primary Examiner* — Thomas F Valone
(74) *Attorney, Agent, or Firm* — Maginot, Moore & Beck LLP

(57) ABSTRACT

A measuring apparatus for sensing metal articles, comprises a transmission coil for producing a magnetic field, two reception coils, which are oriented relative to one another, and electrically connected to one another, in the region of the magnetic field such that a resulting received voltage on the reception coils is zero when the magnetic field acts on both reception coils in the same way, a control device configured to supply the transmission coil with an alternating transmission voltage, and a determination device configured to determine the metal article on the basis of the received voltage. In this arrangement, the control device is further configured to control RMS value for the transmission voltage such that the received voltage remains below a predetermined threshold value.

10 Claims, 4 Drawing Sheets

MEASURING APPARATUS, PARTICULARLY MEASURING APPARATUS FOR SENSING METAL ARTICLES

This application is a 35 U.S.C. §371 National Stage Application of PCT/EP2011/063058, filed on Jul. 29, 2011, which claims the benefit of priority to Serial No. DE 10 2010 039 946.9, filed on Aug. 30, 2010 in Germany, the disclosures of which are incorporated herein by reference in their entirety.

BACKGROUND

Metal detectors which can be used to locate metal articles which can be concealed in walls, in particular, are known. An alternating magnetic field is usually generated by means of a transmission coil in a metal detector of this kind. A pair of reception coils which are connected electrically in series and are oriented back-to-back in parallel is arranged in the region of the generated magnetic field. If there is no metal article in the region of the coils, voltages which are induced in the two reception coils have opposite signs and are cancelled out by the series connection. If a metal article in the magnetic field is at unequal distances from the two reception coils, unequal voltages are induced in the reception coils, with the result that a reception voltage of the reception coils which are connected electrically in series is not equal to zero. The reception voltage is amplified by means of an amplifier and then compared with a threshold value. If the reception voltage exceeds the threshold value, a signal which indicates the metal article is output.

In order to be able to sense a small metal article and/or a metal article which is far away from the coils, the magnetic field which is generated by the transmission coil can be strong and an amplification factor of the amplifier can be large. However, a large metal article and/or a metal article which is close to the coils can in this case lead to a reception voltage which overcontrols the amplifier. Exact determination of the location and/or the borders of the metal article can be adversely affected by such a great sensitivity of the metal detector. The prior art discloses metal detectors of which the sensitivity can be manually adjusted by a user. Furthermore, DE 10 2005 007 803 A1 discloses a metal detector in which different sensitivities are realized by changing a frequency of the alternating voltage across the transmission coil.

However, frequency adjustment of this kind requires complex circuitry and, in the case of implementation by means of a programmable microcomputer, may require a relatively powerful processing unit. Manufacturing costs of the metal detector may be increased in both variants.

The disclosure is based on the object of specifying a measuring apparatus for sensing a metal article, a method for sensing the metal article, and a computer program product for carrying out the method, in which measuring apparatus, method and computer program product the sensitivity of the sensing operation can be adjusted in a simple manner.

The disclosure solves these problems by means of an apparatus, a method, and a computer program product, as described herein.

SUMMARY

According to a first aspect, a measuring apparatus according to the disclosure for sensing a metal article comprises a transmission coil for generating a magnetic field, two reception coils which are oriented relative to one another and are electrically connected to one another in the region of the magnetic field in such a way that a resulting reception voltage of the reception coils is zero when the magnetic field acts on both reception coils in the same way, a control device for supplying an alternating transmission voltage to the transmission coil, and a determination device for determining the metal article on the basis of the reception voltage. In this case, the control device is designed to control a root mean square value of the transmission voltage in such a way that the reception voltage remains below a predetermined threshold value.

The root mean square value of the transmission voltage can be more easily influenced than the frequency of said transmission voltage, and therefore the measuring apparatus can be of relatively simple design.

In a preferred embodiment, the control device is designed to provide a pulse-width-modulated signal to the transmission coil and to control the root mean square value of the transmission voltage on the basis of a duty cycle of the pulse-width-modulated signal.

It is particularly simple to influence the pulse width of a signal with a fixed frequency and this can advantageously be carried out by means of a low-power programmable microcomputer. At the same time, the programmable microcomputer can be used for further control tasks within the measuring apparatus, with the result that a highly efficient design of a metal detector can be achieved. In a particularly preferred embodiment, the signal is a square-wave signal and no further components are provided for converting the square-wave signal into an approximately sinusoidal signal at the transmission coil.

The control device can be designed to change the root mean square value of the transmission voltage depending on the reception voltage. As a result, the dynamic range of the measuring apparatus can be extended, this being largely transparent to a user of the measuring apparatus. In a further embodiment, the change in the sensitivity is compensated for, for example, in a calculated manner within the control device, with the result that the change in sensitivity is partly or completely compensated for in the value which is output by means of the output device.

A reception amplifier can be provided for amplifying the reception voltage, wherein an amplification factor of the reception amplifier can be changed depending on the root mean square value of the transmission voltage.

The extension of the dynamic range of the measuring apparatus can be made even more transparent; overcontrol of the reception amplifier can additionally be avoided, as a result of which improved utilization of the dynamic range of the measuring apparatus can be made possible and an achievable degree of accuracy with which the metal article is determined can be improved.

In a first variant, the root mean square value of the transmission voltage can be continuously changed. Simpler operability of the measuring apparatus can be supported as a result. In a second variant, the root mean square value of the transmission voltage can be changed in discrete steps. Certain variants for influencing the root mean square value of the transmission voltage can be simply implemented by virtue of limiting to discrete stages of the transmission voltage.

According to a second aspect, a method for sensing a metal article comprises the steps of supplying an alternating transmission voltage to a transmission coil in order to generate a magnetic field, determining a reception voltage which is applied to two reception coils which are oriented and electrically connected to one another in such a way that the reception voltage is zero when the magnetic field acts on both reception coils in the same way, sensing the metal article on the basis of the determined reception voltage, and controlling a root mean square value of the transmission voltage in such a way that the reception voltage remains below a predetermined threshold value.

The alternating transmission voltage is preferably a pulse-width-modulated signal, and the root mean square value of the transmission voltage is controlled by means of a duty cycle of the signal.

According to a third aspect, a computer program product comprises program coding means for carrying out the described method when the computer program product is run on a processing device, wherein said computer program product can be stored on a computer-readable medium.

BRIEF DESCRIPTION OF THE DRAWINGS

The disclosure will now be described in greater detail with reference to the appended figures, in which.

DETAILED DESCRIPTION

Figure 1:
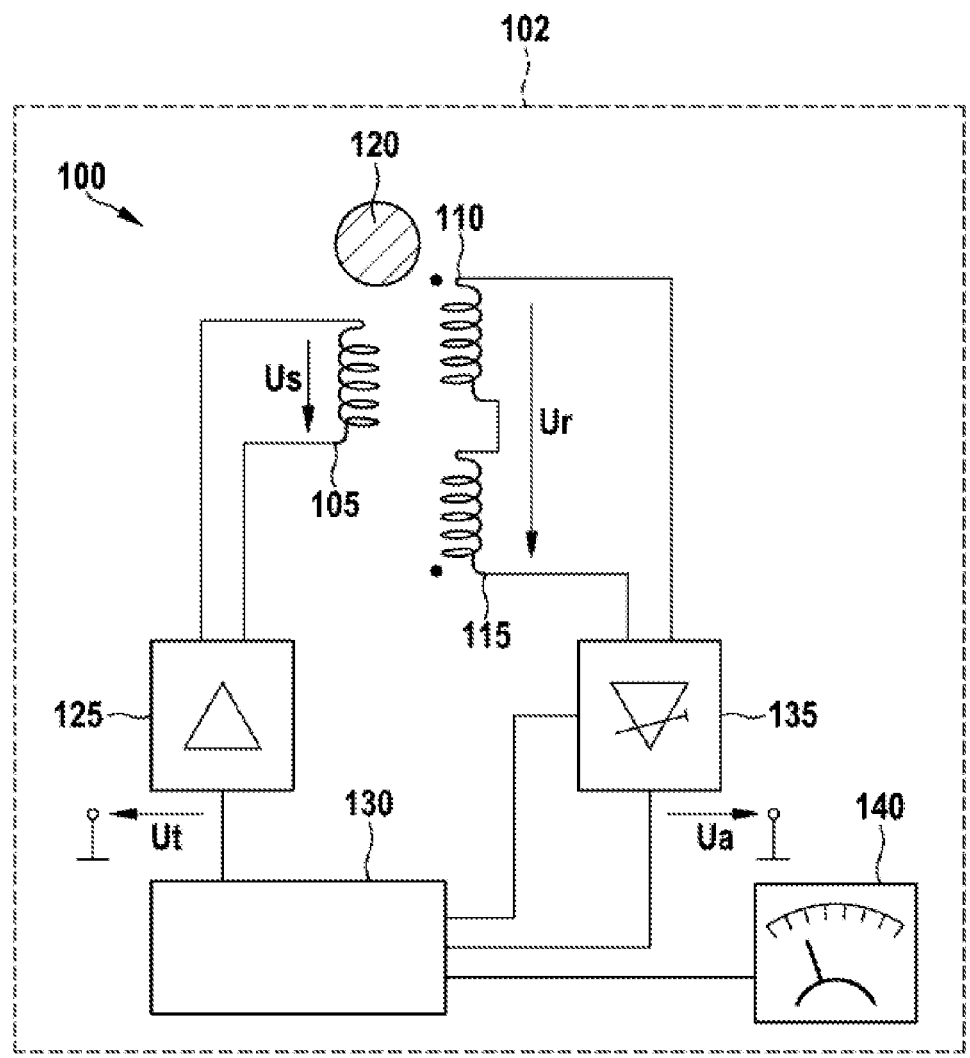
FIG. 1 shows a measuring apparatus for a metal detector.

FIG. 1 shows a measuring apparatus 100 in a metal detector 102. The measuring apparatus 100 comprises a transmission coil 105 which is arranged in the region of a first reception coil 110 and a second reception coil 115. The reception coils 110 and 115 are oriented relative to one another and electrically connected to one another in the region of the magnetic field in such a way that a resulting reception voltage across the reception coils is zero when the magnetic field acts on both reception coils in the same way.

In particular, the reception coils 110 and 115 are oriented such that longitudinal axes, around which windings of the reception coils 110 and 115 are wound, run parallel to one another. For example, the reception coils 110, 115 can be arranged concentrically to one another or in alignment with one another. Depending on the direction in which the windings of the reception coils 110, 115 are wound around the longitudinal axes, a positive or negative voltage is induced in each of the reception coils 110, 115 by virtue of a change in the flux of an external magnetic field. In this case, a positive connection of one of the reception coils 110, 115 is electrically connected to a negative connection of the other reception coil 110, 115, with the result that the induced voltages counteract one another and the total reception voltage which is applied to the respectively other connections of the reception coils 110, 115 is zero if the change in flux affects both reception coils 110, 115 in the same way. The disclosure can be used with numerous arrangements of this kind which are known from the prior art.

The measuring apparatus 100 is designed to determine a metal article 120 which is located in the region of the coils 105 to 115.

The transmission coil 105 is driven by an alternating voltage Us which is provided by a transmission amplifier 125. The transmission amplifier 125 can be an analog or digital amplifier. In a simple embodiment, the transmission amplifier 125 comprises only a transistor which is preferably operated as a switch. In another embodiment, the transmission amplifier 125 comprises four transistors in an H circuit, with all four transistors being operated as switches.

The transmission amplifier 125 is driven by a sampling signal Ut which is provided by a control device 130. The control device 130 is preferably designed as a programmable microcomputer. The sampling signal Ut is preferably output by means of a digital output connection ("port") of the control device 130.

The output connection can be controlled by a programmable timer or counter which is provided within the control device 130. The timer can cause the control device 130 to change over the sampling signal Ut from a high value to a low value, or vice versa. This is usually done by means of an interruption request ("interrupt") from the timer to the control device 130. The control device 130 can perform other tasks, for example interaction with a user, between the interruptions.

The time between two successive transitions of the sampling signal Ut from a high value to a low value is always the same, but the time for which the sampling signal remains at the high value can be influenced by the control device 130, as a result of which the time for which the sampling signal remains at the low value is also influenced. A ratio between these two time periods is called the duty cycle and is usually indicated in percent. If both time periods are the same, the duty cycle is 50%. The sampling signal is pulse-width-modulated in this way and is also called a PWM signal ("pulse-width-modulated signal").

A root mean square value of the transmission voltage Us across the transmission coil 15 is also changed by influencing the duty cycle of the sampling signal Ut. The root mean square value (RMS value) is the root mean square of the alternating transmission voltage Us which is applied to the transmission coil 105 and indicates which DC voltage would produce a corresponding electrical power at the transmission coil 105 if the transmission coil 105 is considered to be a resistive load. The strength of a magnetic field which is generated by the transmission coil 105 can be controlled by means of the root mean square value of the transmission voltage Us.

As a result of the root mean square value of the transmission voltage Us across the transmission coil 105 being influenced by pulse width modulation, the average number of interruption requests to the control device 130 remains the same over a time period, even if the duty cycle of the pulse width modulation changes. The interruption load on the control device 130 therefore remains constant, with the result that other tasks of the control device 130 can be managed largely independently of the duty cycle.

The reception coils 110 and 115 which are interconnected in series are connected to a reception amplifier 135, with the result that said reception amplifier can amplify a reception voltage Ur of the reception coils 110, 115. The reception amplifier 135 has an amplification factor which can be influenced by means of the control device 130 in a preferred embodiment. The reception amplifier provides the control device 130 with an output voltage Ua, which corresponds to the reception voltage Ur which is amplified by the amplification factor, by means of a corresponding connection. The control device 130 can have a suitable analog/digital converter for the purpose of evaluating the output voltage Ua.

Furthermore, the control device 130 is connected to an output device 140. The output device 140 is designed to output optical and/or acoustic signals in analog or digital form. The control device 130 is designed to drive the output device 140 in dependence on the amplified reception voltage Ur which is provided by the reception amplifier 135, with the result that a user of the measuring apparatus 100 or of the metal detector 102 is given an indication of the metal article 120. In a variant, the output device 140 is controlled directly by the output voltage Ua which is provided by the reception amplifier 135 and the control device leaves the output device 140 uninfluenced. To this end, the reception amplifier 135 and the output device 140 are directly connected to one another by means of a corresponding connection.

The sampling signal Ut which is provided by the control device 130 is a pulse-width-modulated square-wave signal which is amplified by the transmission amplifier 125 and is provided by the transmission coil 105. The square-wave signal is usually converted into a sinusoidal signal by parasitic effects in the region of the transmission amplifier 125 and the transmission coil 105 to a sufficient extent, with the result that harmonics which are produced by driving of the transmission coil 105 are sufficiently reduced. A reduction in harmonics in the reception voltage Ur is achieved by the magnetic coupling of the transmission coil 105 to the reception coils 110 and 115 and by a transfer characteristic of the reception amplifier 135.

The magnetic field which is generated by the transmission coil 105 as a function of the alternating transmission voltage Us initially acts on the first reception coil 110 and the second reception coil 115 in the same way and induces a respective voltage in both reception coils 110, 115. Since the reception coils 110 and 115 are oriented back-to-back in parallel, the reception voltage Ur of the reception coils 110 and 115 which are interconnected in series is zero in total. If the metal article 120 is located in the region of the generated magnetic field, with the result that it is situated closer to one of the reception coils 110, 115 than the other, the magnetic field which is generated by the transmission coil 105 does not act on the transmission coils 110 and 115 in the same way, with the result that the reception voltage Ur is different from zero. The magnitude of the reception voltage Ur is dependent on a ratio of the distances of the metal article 120 from the reception coils 110 and 115 and a size of the metal article 120.

The control device 130 controls the duty cycle of the sampling signal Ut in dependence on the reception voltage Ur or the output voltage Ua. This results in a change in the root mean square value of the transmission voltage Us and consequently also in the strength of the magnetic field which is generated by the transmission coil 105. If the reception voltage Ur is, for example, zero, the sampling signal Ut is set to a duty cycle of 50%, with the result that the strength of the magnetic field which is provided by the transmission coil 105 is at a maximum. A sensitivity of the measuring apparatus 100 is at a maximum as a result.

If, however, the amplified reception voltage Ur is high, the duty cycle of the sampling signal Ut is set to a low value, for example 2%. The magnetic field which is generated by the transmission coil 105 is greatly reduced in relation to the above-described situation, with the result that the reception signal Ur is likewise smaller. A sensitivity of the measuring apparatus 100 is reduced as a result.

In an alternative embodiment, the control device 130 does not influence the amplification factor of the reception amplifier 135 but rather ensures, by virtue of driving the output device 140 in a corresponding manner, that a user is given an indication of the currently used sensitivity of the measuring apparatus 100.

Figure 2:
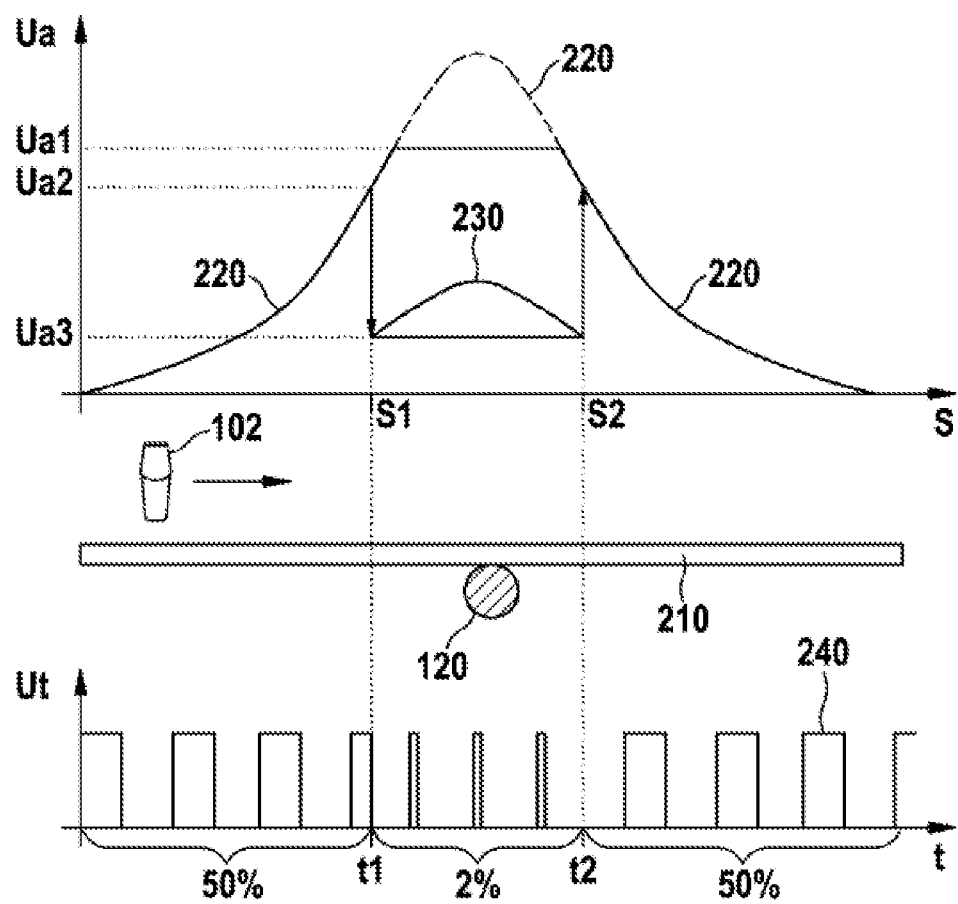
FIG. 2 shows a graph for illustrating the manner of operation of the measuring apparatus from FIG. 1.

FIG. 2 shows a graph 200 for illustrating the manner of operation of the measuring apparatus 100 from FIG. 1. A central region of FIG. 2 shows the metal detector 102 and the metal article 120 from FIG. 1, said metal detector and metal article being separated from one another by a wall 210. The metal detector 102 is moved in the horizontal direction parallel to the wall 210.

In an upper region of FIG. 2, a section S which describes a position of the metal detector 102 along the movement path on the wall 210 is plotted in the horizontal direction. The output voltage Ua which is provided by the reception amplifier 135 is plotted in the vertical direction. A first voltage profile 220 in graph 200 shows a theoretical profile of the output voltage Ua of the reception amplifier 135 during movement of the metal detector 102 along the wall 210. The first voltage profile 220 has the approximate shape of a bell curve.

If the metal detector 102 is located in a section between S1 and S2 along the wall 210, it is so close to the metal article 120 that the reception amplifier 135 overcontrols in respect of the ideal assumptions of the first voltage profile 220 in this region and the output voltage Ua does not exceed a maximum output voltage Ua1. In general, any amplifier with an amplification factor greater than one can be overcontrolled by an input signal of corresponding magnitude.

In order to avoid overcontrol, a root mean square value of the transmission voltage Us to the transmission coil 105 of the measuring apparatus 100 in FIG. 1 is reduced when the first voltage profile 220 reaches a first threshold value Ua2, with the result that a second voltage profile 230 is established between S1 and S2. The second voltage profile 230 has substantially the same shape as the first voltage profile 220 in the relevant section, but is reduced by a predetermined factor.

In a lower section of FIG. 2, a profile of the sampling signal Ut in the vertical direction is indicated with respect to time t in the horizontal direction. Assuming that the metal detector 102 is moved at a uniform speed along the wall 210, this illustration is comparable with the graph 200 in the upper section of FIG. 2. The root mean square value of the transmission voltage Us in FIG. 1 is changed by varying the duty cycle of the sampling signal Ut, as a result of which the intensity of the output signal Ua is ultimately changed too.

In a section to the left of point S1, which corresponds to a time point t1, the duty cycle of the sampling signal Ut is 50%. From S1, moving to the right, to point S2, which corresponds to a time point t2, the duty cycle is only 2%. To the right of point S2 or time point t2, the duty cycle is again 50%.

In the embodiment illustrated in FIG. 2, the root mean square value of the transmission voltage Us of the transmission coil 105 is changed in two discrete stages which correspond to the duty cycles 50% and 2%. In other embodiments of the disclosure, other or more different duty cycles are also possible. The duty cycles can also be changed in a continuous manner. In all cases, the root mean square value of the transmission voltage Us which is applied to the transmission coil 105 is at a maximum when the duty cycle of the sampling signal Ut corresponds to 50%.

Figure 3:
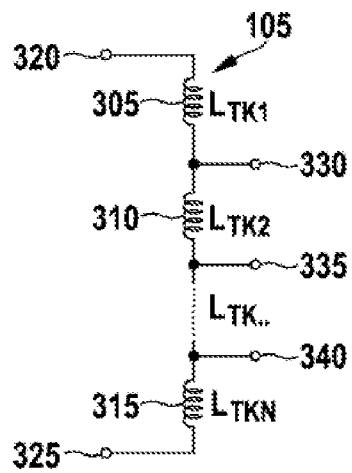
FIG. 3 shows an alternative embodiment of the transmission coil from FIG. 1.

FIG. 3 shows an alternative embodiment of the transmission coil 105 from FIG. 1. The transmission coil 105 is constructed as a series of transmission coil elements 305, 310 and 315. In addition to end taps 320 and 325, this also produces a number of intermediate taps 330, 335, 340. Any two of the taps 320 to 340 can be connected to the transmission amplifier 125 from FIG. 1, with the choice of taps 320 to 340 determining a number of turns that the transmission coil elements 305 to 315 which are situated between the taps 320 to 340 have in total. This means the inductance of the transmission coil 105 can be changed, as a result of which the strength of the magnetic field which is generated by the transmission coil 105 varies. The electrical properties of the transmission coil 105 change at the same time, with the result that the root mean square value of the transmission voltage Us is also varied by varying the inductance.

Figure 4:
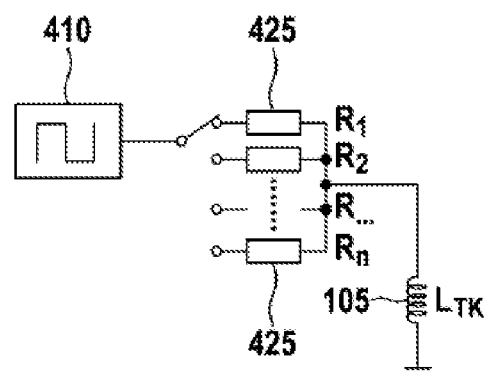
FIG. 4 shows an alternative manner of influencing the root mean square value of the transmission voltage in FIG. 1.

FIG. 4 shows an alternative way in which the root mean square value of the transmission voltage in FIG. 1 is influenced. A square-wave generator 410 provides a preferably symmetrical square-wave voltage. The signal which is provided by the square-wave generator 410 is connected to a first connection of one of several different resistors 425 by means of a multiple changeover switch 420. Second connections of the resistors 425 are respectively connected to one of the connections of the transmission coil 105. The second connection of the transmission coil 105 is electrically connected to ground. In each case another of the resistors 425 is connected in series with the transmission coil 105 by switching over the multiple changeover switch 420, as a result of which a current through the transmission coil 105 and therefore also the root mean square value of the transmission voltage Us are varied.

Figure 5:
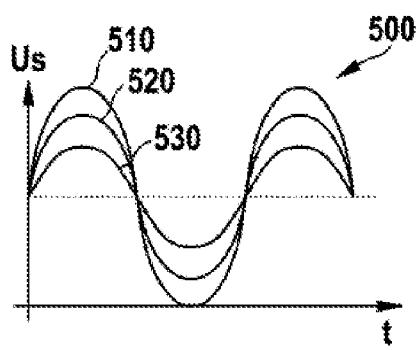
FIG. 5 shows an illustration of different transmission voltages across the transmission coil of FIG. 1.

FIG. 5 shows an illustration 500 of different transmission voltages Us across the transmission coil 105 in FIG. 1. Time t is plotted in a horizontal direction, and the transmission voltage Us is plotted in a vertical direction. A first profile 510 corresponds to a duty cycle of 50% of the sampling signal Ut. A second profile 520 with a lower amplitude corresponds to a duty cycle of approximately 10%. A third profile 530 with a further reduced amplitude corresponds to a duty cycle of approximately 2%.

Figure 6:
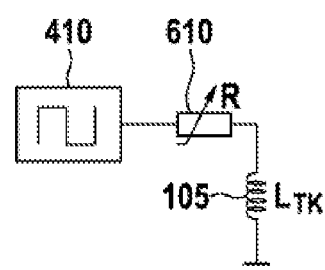
FIG. 6 shows a further alternative manner of influencing the root mean square value of the transmission voltage in FIG. 1.

FIG. 6 shows a further alternative way in which the root mean square value of the transmission voltage Us in FIG. 1 is influenced. The illustrated circuit corresponds to that of FIG. 4, with the multiple changeover switch 420 and the resistors 425 being replaced by a variable resistor 610. It is possible to continuously influence the current and, respectively, the root mean square value of the voltage across the transmission coil 105 by varying the resistance value of the variable resistor 610.

Figure 7:
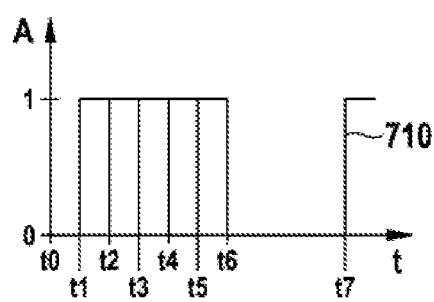
FIG. 7 shows an illustration of different duty cycles of the sampling signal in FIG. 1.

FIG. 7 shows an illustration of different duty cycles of the sampling signal Ut which is provided to the transmission amplifier 125 in FIG. 1. A profile 710 between a low amplitude 0 and a high amplitude 1 is illustrated. In this case, the profile 710 can have different duty cycles at a constant frequency. In each of the cases described below, the amplitude of the profile 710 increases from 0 to 1 at a time point t1, and then again at a time point t7.

In a first case, the amplitude of the profile 710 falls from 1 to 0 at a time point t2, this corresponding to a duty cycle of approximately 10%.

In a second case, the amplitude of the profile 710 falls from 1 to 0 at a time point t3, this corresponding to a duty cycle of approximately 20%.

In a third case, the amplitude of the profile 710 falls from 1 to 0 at a time point t4, this corresponding to a duty cycle of approximately 30%.

In a fourth case, the amplitude of the profile 710 falls from 1 to 0 at a time point t5, this corresponding to a duty cycle of approximately 40%.

In a fourth case, the amplitude of the profile 710 falls from 1 to 0 at a time point t6, this corresponding to a duty cycle of approximately 50%.

Figure 8:
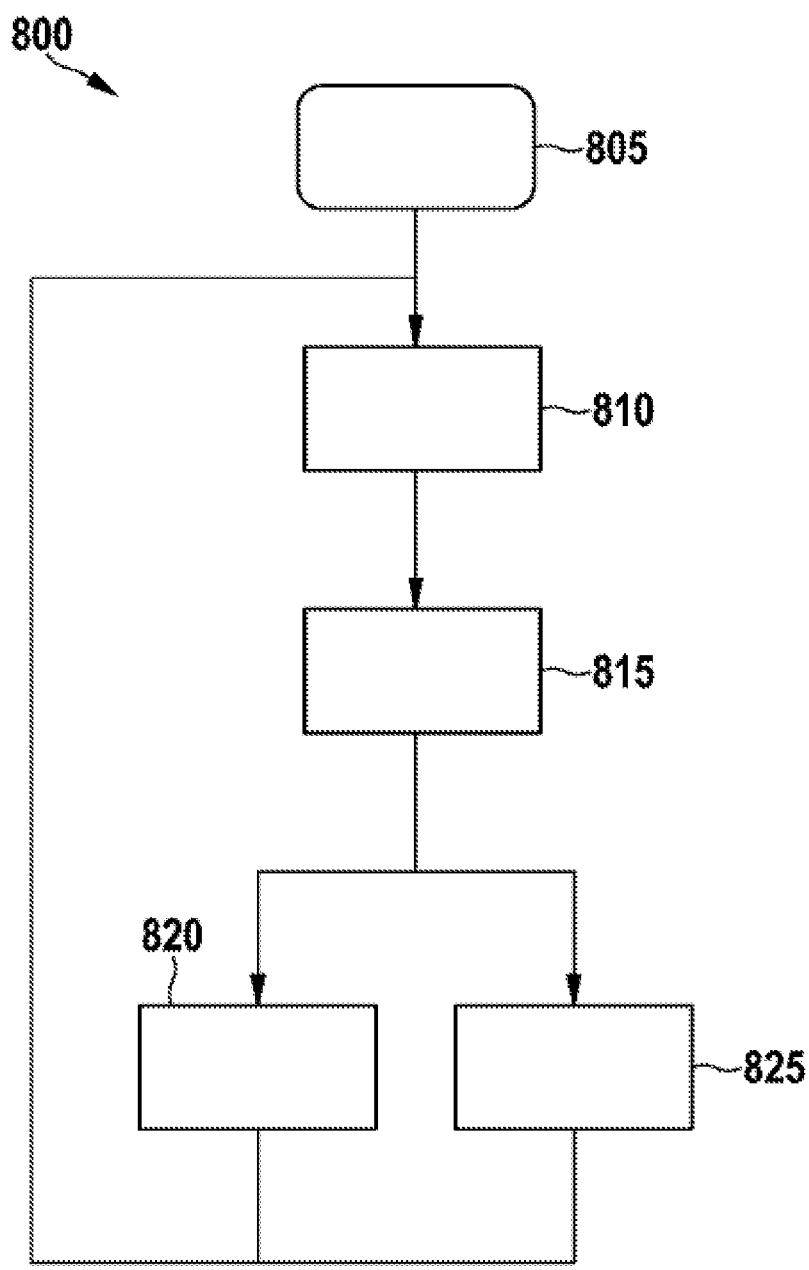
FIG. 8 shows a flowchart of a method for controlling the measuring apparatus of FIG. 1.

FIG. 8 shows a flowchart of a method 800 for controlling the measuring apparatus 100 from FIG. 1. In a first step 805, the method 800 is in the start state.

Thereafter, in a step 810, the transmission coil 105 is supplied with the alternating transmission voltage Us, with the result that the transmission coil 105 generates a magnetic field in the region of the reception coils 105, 110.

Then, in a step 815, the reception voltage Ur or the output voltage Ua is determined, this being based on the reception voltage Ur which is induced in the reception coils 105, 110 in total by the generated magnetic field.

Then, in a step 820, the article 120 is sensed on the basis of the voltage which is determined in step 815. In parallel with this, the root mean square value of the transmission voltage Us is controlled in a step 825. The root mean square value of the transmission voltage Us is preferably controlled in dependence on the sensed output voltage Ua.

The method 800 then returns to step 810 and is run through again.

The invention claimed is:

1. A measuring apparatus for sensing metal articles comprising:
    a transmission coil configured to generate a magnetic field;
    two reception coils which are oriented relative to one another and electrically connected to one another in a region of the magnetic field in such a way that a resulting reception voltage across the two reception coils is zero when the magnetic field acts on the two reception coils in the same way;
    a control device configured (i) to supply an alternating transmission voltage to the transmission coil, and (ii) to change a root mean square value of the alternating transmission voltage in such a way that the resulting reception voltage remains below a predetermined threshold value irrespective of the size of the metal article; and
    a determination device configured to determine the metal article on the basis of the resulting reception voltage.

2. The measuring apparatus as claimed in claim 1, wherein the control device is further configured (i) to provide a pulse-width-modulated signal to the transmission coil, and (ii) to control the root mean square value of the alternating transmission voltage on the basis of a duty cycle of the pulse-width-modulated signal.

3. The measuring apparatus as claimed in claim 2, wherein the control device is further configured to change the root mean square value of the alternating transmission voltage depending on the resulting reception voltage.

4. The measuring apparatus (100) as claimed in claim 1, further comprising:
    a reception amplifier configured to amplify the resulting reception voltage,
    wherein an amplification factor of the reception amplifier is configured to be changed depending on the root mean square value of the alternating transmission voltage.

5. The measuring apparatus as claimed in claim 1, wherein the alternating transmission voltage is configured to be changed continuously.

6. The measuring apparatus as claimed in claim 1, wherein the alternating transmission voltage is configured to be changed in two discrete effective stages.

7. A method for sensing a metal article, comprising:
    supplying an alternating transmission voltage to a transmission coil in order to generate a magnetic field;
    determining a reception voltage which is applied to two reception coils which are oriented and electrically connected to one another in such a way that the reception voltage is zero when the magnetic field acts on the two reception coils in the same way;
    sensing the metal article on the basis of the determined reception voltage; and controlling a root mean square value of the alternating transmission voltage in such a way that the reception voltage remains below a predetermined threshold value.

8. The method as claimed in claim 7, wherein:

the alternating transmission voltage is a pulse-width-modulated signal, and the root mean square value of the transmission voltage is controlled on the basis of a duty cycle of the signal.

9. A computer program product comprising:

a program coding mechanism configured to carry out a method for sensing a metal article when the computer program product is run on a processing device, wherein the method includes (i) supplying an alternating transmission voltage to a transmission coil in order to generate a magnetic field, (ii) determining a reception voltage which is applied to two reception coils which are oriented and electrically connected to one another in such a way that the reception voltage is zero when the magnetic field acts on the two reception coils in the same way, (iii) sensing the metal article on the basis of the determined reception voltage, and (iv) controlling a root mean square value of the alternating transmission voltage in such a way that the reception voltage remains below a predetermined threshold value.

10. The computer program product as claimed in claim 9, wherein the computer program product is configured to be stored on a computer-readable medium.

* * * * *